United States Patent [19]

Anderson et al.

[11] 4,224,602
[45] Sep. 23, 1980

[54] SIGNALLING DEVICE

[75] Inventors: Richard W. Anderson, Reading; Alfred I. Bottner, Natick, both of Mass.

[73] Assignee: GTE Sylvania Incorporated, Stamford, Conn.

[21] Appl. No.: 965,756

[22] Filed: Dec. 4, 1978

[51] Int. Cl.$^2$ .................... H04B 1/034; H01H 13/04; H01H 9/18; G08B 21/00

[52] U.S. Cl. ................... 340/321; 340/171 R; 340/365 S; 340/696

[58] Field of Search .......................... 340/321, 365 S; 178/17 R; 325/111, 118, 119, 361; 343/225, 171 R

[56] References Cited

U.S. PATENT DOCUMENTS

| | | | |
|---|---|---|---|
| 2,810,068 | 10/1957 | Weisz et al. | 325/111 |
| 3,676,607 | 7/1972 | Nash et al. | 178/17 R |
| 3,676,615 | 7/1972 | Weidmer | 200/1 R |
| 3,777,222 | 12/1973 | Harris | 340/365 S |
| 4,078,257 | 3/1978 | Bagley | 340/365 S |
| 4,101,871 | 7/1978 | Oliveira | 340/365 S |
| 4,121,160 | 10/1978 | Cataldo | 340/321 |

Primary Examiner—Donald J. Yusko
Attorney, Agent, or Firm—Peter Xiarhos

[57] ABSTRACT

A small, portable lightweight, water-resistant, manually-operated signalling device. The signalling device includes a signalling assembly fully enclosed within a pair of hermetically sealed housings. The signalling assembly includes a signalling circuit and a pressure sensitive switch adapted, when depressed, to actuate the signalling circuit. One of the housings includes a recessed, flat, semi-rigid deflective wall having an indentation formed therein and in physical contact with the pressure sensitive switch. The indentation is capable of being manually depressed and, when depressed, to transmit the pressure applied to the indentation to the switch, thereby operating the signalling circuit. The indentation and the switch are arranged with respect to each other so that depression of the switch and actuation of the signalling circuit can only occur in response to pressure being applied to the indentation.

The signalling device further includes a shock-absorbing rim formed at the perimeter of the housing having the indentation therein for minimizing the possibility of unintentional or accidental operation of the signalling device by virtue of the signalling device coming into physical contact with a surface or object, as by dropping the signalling device.

13 Claims, 4 Drawing Figures

SIGNALLING DEVICE

BACKGROUND OF THE INVENTION

The present invention relates to a signalling device and, more particularly, to a small, portable, lightweight, water-resistant, manually-actuated signalling device having design features for minimizing false or accidental operation.

There are many applications in which it is desirable to employ a signalling device, such as a manually-actuated rf transmitter, which is small, portable, lightweight, water-resistant and not readily susceptible to accidental or unintentional operation. Most commercially-available signalling devices typically employ an on/off actuating switch which is either a raised switch, for example, in the manner of an on/off switch for a paging device or electronic calculator, or recessed within a cavity or depression to prevent accidental or unintentional actuation by virtue of contact with other surfaces. Another type of signalling device, typically carried on the person of the user (e.g., in a pendant form), employs an actuating assembly disposed within a soft, flexible container or bag. The device is enabled by squeezing or compressing the container in prescribed regions whereby the internally-disposed actuating assembly is placed in its "on" position. A device of this type is described in U.S. Pat. No. 4,121,160.

In the case of signalling devices employing raised on/off switches, these devices are susceptible to being accidentally or unintentionally actuated by virtue of the switches being accidentally or unintentionally placed in their "on" positions. In addition, if these signalling devices employ batteries the batteries are susceptible to being undesirably discharged thereby rendering the signalling devices unusable. Further, these signalling devices are not water resistant since liquids can seep into interior areas via small openings around the on/off switches. Signalling devices employing recessed on/off switches are similarly not water resistant. In the case of signalling devices of the squeeze or compressible type, these devices are susceptible to possible false or unintentional operation by virtue of a user or other person unintentionally or accidentally compressing the device against a hard surface, for example, by bumping, sitting or rolling onto the device. In addition, it may be difficult in certain situations for a user of the device to readily locate the regions of the container to be squeezed, for example, if the device is required to be actuated in the dark or by a blind person. Further, the squeezing operation may be difficult to accomplish by persons whose hands are adversely affected by arthritis or some other affliction.

BRIEF SUMMARY OF THE INVENTION

In accordance with the present invention a manually-actuated signalling device is provided which avoids the disadvantages and shortcomings of signalling devices as described hereinabove. The signalling device in accordance with the present invention includes first and second housings and a signalling circuit assembly. The signalling circuit assembly is disposed within the first housing and includes a signalling circuit and a depressible pressure sensitive switch operative when depressed to activate the signalling circuit. The second housing cooperates with the first housing to fully enclose the signalling circuit assembly within the first and second housings.

In accordance with the present invention the second housing includes a semi-rigid deflective wall having an indentation therein extending in the direction of the first housing and physically adjacent to the pressure sensitive switch. The indentation is capable of being manually depressed and, when depressed, to deflect the wall of the housing and to transmit the pressure applied to the indentation to the pressure sensitive switch to cause depression of the switch and actuation of the signalling circuit. The indentation in the wall of the second housing and the pressure sensitive switch are arranged with respect to each other so that depression of the switch and actuation of the signalling circuit can only occur in response to pressure being applied to the indentation in the wall of the second housing.

BRIEF DESCRIPTION OF THE DRAWING

Various objects, features and advantages of a manually-actuated signalling device in accordance with the invention will be apparent from the following description taken in conjunction with the accompanying drawing in which.

DETAILED DESCRIPTION OF THE INVENTION

Figure 1:
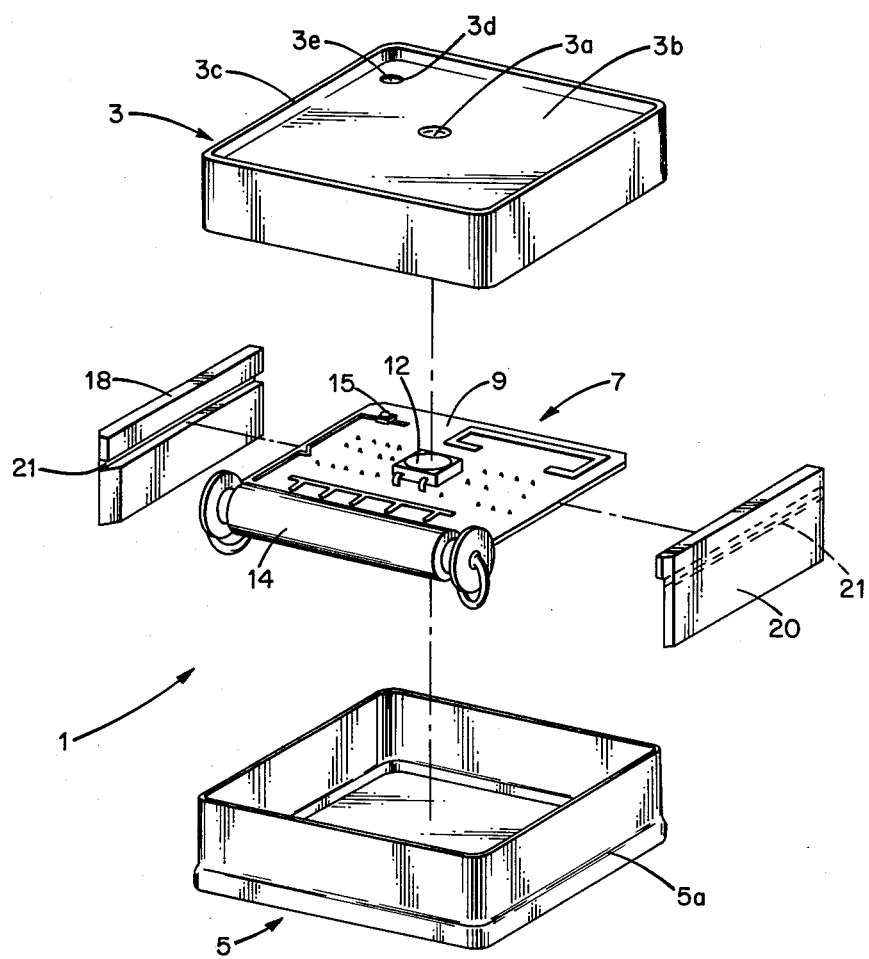
FIG. 1 is an exploded perspective view of a manually-actuated signalling device in accordance with the present invention.
Figure 2:
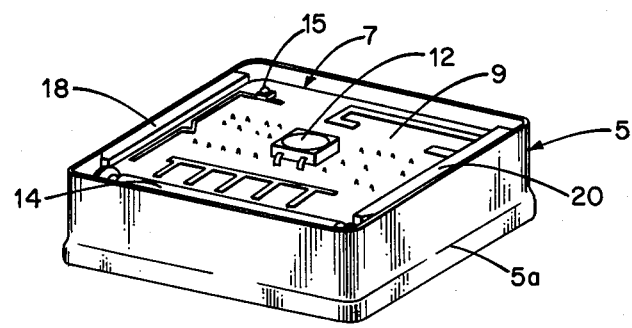
FIG. 2 illustrates a circuit assembly of the signalling device as housed within the signalling device during assembly of the signalling device.
Figure 3:
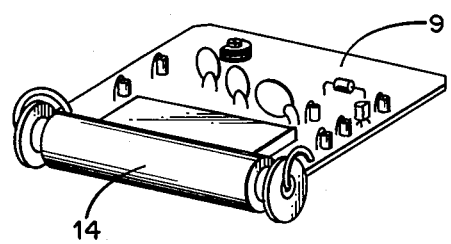
FIG. 3 illustrates typical electrical circuit components of the circuit assembly of FIG. 2.

Referring now to FIGS. 1-4 there is shown a manually-operated signalling device 1 in accordance with the present invention. As best shown in the exploded perspective view of FIG. 1, the signalling device 1 generally includes a rectangular upper housing 3, a rectangular lower housing 5 and a circuit assembly 7. The circuit assembly 7 is adapted to be housed within the lower housing 5, for example, as indicated in FIG. 2, and typically includes a printed circuit board 9 having standard electrical components mounted on a bottom surface thereof, for example, as shown in FIG. 3, to form a standard electrical signalling circuit. By way of example, the electrical components of the circuit assembly 7 may be interconnected in a fashion to provide a signalling device in the specific form of a miniaturized rf transmitter.

Actuation of the signalling device 1 is achieved in accordance with the invention by means of a pressure-sensitive button or switch 12 mounted on the top surface of the printed circuit board 9. Actuation of the switch 12 allows dc power, for example, from a standard dc battery 14, to be applied to the signalling circuit assembled on the printed circuit board 9 to cause the signalling circuit to perform its signalling operations. The actuation of the switch 12 also serves to cause illumination of a small indicator, such as a light emitting diode 15, to apprise the user of the signalling device 1 that the signalling device 1 has been actuated.

The circuit assembly 7 as described above further includes a pair of mounting elements or stanchions 18 and 20. The elements 18 and 20, typically of a non-conducting plastic material, each have a slot 21 therein, as best shown in FIG. 1, for engaging a corresponding edge of the printed circuit board 9. When the circuit assembly 7 is placed within the lower housing 5 as shown in FIG. 2, the mounting elements 18 and 20 serve to position the circuit assembly 7 so that the upper surface of the switch 12 is generally flush with the top surfaces of the edges of the sides of the lower housing 5. To complete the assembly of the signalling device 1 as shown in FIG. 2, the upper housing 3, which has slightly larger physical dimensions than the lower housing 5, is telescoped over the lower housing 5. When the upper housing 3 is properly positioned with respect to the lower housing 5, the bottom edges of the sides of the lower housing 5 abut against a ridge or abutment 5a, shown in FIG. 1, formed in the sides of the lower housing 5. The aforementioned mounting elements 18 and 20 serve at this time to provide stiffening to the sides of the housings 3 and 5 adjacent to the mounting elements. To join the two housings 3 and 5 so that the signalling device 1 is rendered water resistant, a solvent welding material capable of dissolving the material of the housings 3 and 5 is preferably placed on the mutually contacting portions of the housings 3 and 5 so that the material at these portions dissolves and then hardens to in effect "weld" or hermetically seal the two housings together. The solvent welding process also serves to strengthen the sides of the housings 3 and 5 and to discourage tampering. For a typical housing material of acrylic-polyvinyl chloride alloy plastic, a suitable solvent welding material is tetrahydrofuran.

The upper housing 3 as described above is employed in conjunction with the pressure-sensitive switch 12 of the circuit assembly 7 to actuate or enable the signalling device 1. More specifically, the upper housing 3 has a small, circular, concave indentation of dimple 3a formed generally in the center of a deflective, semi-rigid wall 3b. The dimple 3a is located in the wall 3b of the upper housing 3 so as to overlie and touch the switch 12 of the circuit assembly 7. To actuate the signalling device 1 it is only necessary for the user to press down on the dimple 3a so that the semi-rigid wall 3b of the upper housing 3 is deflected downwardly slightly and the pressure applied to the dimple 3a is transmitted to, and actuates, the pressure sensitive switch 12. As the switch 12 returns to its initial position, the force of this return operation is transmitted back to the user via the dimple 3a thereby providing tactile feedback to the user. Application of pressure to any other part of the wall 3b of the housing 3 will not actuate the switch 12 since these parts are not in physical contact with the switch 12. As a result, the possibility of false or unintentional actuation of the signalling device 1 is minimized. By the provision of the dimple 3a in an otherwise flat wall, a user can readily and easily locate the dimple 3a solely by the sense of feel and thereupon operate the device 1 by a simple dimple-pushing operation as opposed to a squeezing or compressing operation. The provision of the dimple 3a in an otherwise flat wall could be important if, for example, a user were required to operate the signalling device 1 in the dark or if the user were blind.

The upper housing 3 further has an upstanding ridge or rim 3c formed at the perimeter of the wall 3b and restraining the edges of the wall 3b. The rim 3c serves to further minimize unintentional or accidental actuation of the switch 12 by spacing, or recessing, the wall 3b and the dimple 3a formed therein from any flat surface against which the signalling device 1 may be placed.

The rim 3c also serves as a "shock absorber" by absorbing the effects of impact in the event the signalling device 1 is accidentally or unintentionally dropped against some hard surface or object. The rim 3c further serves as a locater for the dimple 3a should a user find it necessary to operate the signalling device 1 in the dark or if the user is blind.

The upper housing 3 as described above further includes a small circular opening 3d at a corner region thereof located above the light emitting diode 15. The opening 3d is covered from inside the housing 3 with a small piece of colored (e.g., red) light-transmitting tape 3e for permitting passage therethrough of light from the light emitting diode 15 to alert or inform the user of the signalling device 1 that the signalling device 1 has been actuated, specifically, by actuation of the pressure sensitive switch 12. The tape 3e also serves to seal the opening 3d to prevent passage of liquids into the interior of the signalling device 1.

Figure 4:
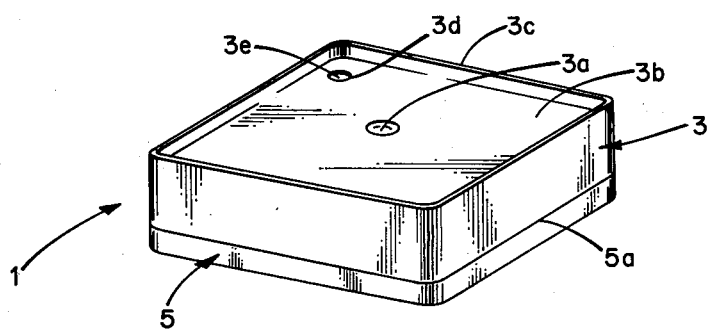
FIG. 4 illustrates the signalling device in its final assembled form.

The signalling device 1 may be constructed to be of a size so as to enable a user to conveniently carry the signalling device on his person, for example, in a pocket or purse or, although not shown, by a clip which may be attached to the signalling device 1 and secured to an article of clothing. Typical outer dimensions for the signalling device 1 in its final assembled form as shown in FIG. 4 are 2¼"×2¼"×13/16". The rectangular configuration of the signalling device 1 prevents the signalling device from rolling in the event it is dropped by the user. A typical weight for the signalling device 1 is about 1.5 ounces, and a typical thickness for the housings 3 and 5 is 0.02".

It will now be apparent that a signalling device 1 has been described which is small, portable, lightweight, water-resistant and, due to the provision of the internally-located switch 12 and the dimple 3a and the rim 3c in the housing 3, not readily susceptible to unintentional or accidental operation. The operation of the signalling device 1 is selective to the extent that the signalling device 1 can only be operated by depression of the dimple 3a and not some other part of the signalling device 1. The dimple 3a, by virtue of its presence in an otherwise flat wall, and the rim 3c also enable the user to readily locate the dimple 3a by feel so that the user can then easily and quickly operate the signalling device 1. The design features of the signalling device 1 as described hereinabove thereby minimize the possibility of unintentional or accidental actuation of the signalling device 1 by virtue of the signalling device 1 being placed or dropped onto a surface or object or coming in contact with the person of the user or some other person.

While there has been described what is considered to be a preferred embodiment of the invention, it will be apparent to those skilled in the art that various changes and modifications may be made therein without departing from the invention as called for in the appended claims.

What is claimed is:

1. A manually-actuated signalling device, comprising:
   a first housing;
   a signalling circuit assembly disposed within the first housing and including a signalling circuit and a depressible pressure sensitive switch operative when depressed to actuate the signalling circuit; and a second housing cooperating with the first housing for fully enclosing the signalling circuit assembly within the first and second housing;

said second housing including a resilient semi-rigid deflective wall having an indentation therein extending in the direction of the first housing and physically adjacent to the pressure sensitive switch, said indentation being capable of being manually depressed and, when depressed, to deflect the wall of the housing and physically touch the pressure sensitive switch to transmit the pressure applied to the indentation to the pressure sensitive switch to cause depression of the switch and actuation of the signalling circuit, said indentation in the wall of the second housing and the pressure sensitive switch being arranged with respect to each other so that depression of the switch and actuation of the signalling circuit can occur only in response to pressure being applied to the indentation in the wall of the second housing, said semi-rigid deflective wall being operative upon release of the pressure applied to the indentation to return to its original position; and said second housing further including upstanding ridge members integral with the semi-rigid deflective wall and spaced from the indentation in the semi-rigid deflective wall for facilitating the location of the indentation in the deflective wall, for spacing the deflective wall and the indentation therein from a surface against which the signalling device may be placed, and for absorbing the effects of impact of the signalling device against a surface, thereby reducing the possibility of false actuation of the pressure sensitive switch.

2. A manually-actuated signalling device in accordance with claim 1 wherein:
the indentation in the semi-rigid deflective wall of the second housing and the pressure sensitive switch are arranged with respect to each other so that prior to depression of the indentation in the wall of the second housing the indentation is in direct physical contact with the pressure sensitive switch.

3. A manually-actuated signalling device in accordance with claim 1 wherein:
the indentation in the wall of the second housing is a generally circular, concave dimple.

4. A manually-actuated signalling device in accordance with claim 3 wherein:
the first and second housings are of the same general physical configuration, one of the housings having larger dimensions than the other to permit the housing with the smaller dimensions to telescope within the housing having the larger dimensions.

5. A manually-actuated signalling device in accordance with claim 4 wherein:
the semi-rigid deflective wall of the second housing has an area surrounding the dimple which is generally flat to allow a user of the signalling device to locate the dimple by the sense of feel.

6. A manually-actuated signalling device in accordance with claim 5 wherein:
the first and second housings are generally rectangular in configuration.

7. A manually-actuated signalling device in accordance with claim 5 wherein:
the signalling circuit assembly further includes an indicator operative to be illuminated when the pressure sensitive switch is caused to be depressed; and
the second housing has an opening in the semi-rigid deflective wall thereof adjacent to the indicator of the signalling circuit, said opening being covered by a light-transmitting material for permitting passage therethrough of light from the indicator.

8. A manually-actuated signalling device in accordance with claim 1 wherein:
one of the housings is telescoped within the other, said housings being of a plastic material and hermetically sealed together at predetermined areas by a solvent welding material to prevent passage of liquids into the interior of the signalling device.

9. A manually-actuated signalling device in accordance with claim 1 wherein:
the upstanding ridge members of the second housing are located at the perimeter of the second housing.

10. A manually-actuated signalling device in accordance with claim 9 wherein:
the semi-rigid deflective wall of the second housing has an area surrounding the dimple to the location of the upstanding ridge of the second housing which is generally flat to allow a user of the signalling device to locate the indentation by the sense of feel; and
said indentation in the wall of the second housing is a generally circular, concave dimple.

11. A manually-actuated signalling device in accordance with claim 10 wherein:
the first and second housings are of a plastic material and are hermetically sealed together at predetermined areas by a solvent welding material to prevent passage of liquids into the interior of the signalling device.

12. A manually-actuated signalling device in accordance with claim 11 wherein:
the signalling circuit assembly further includes an indicator operative to be illuminated when the pressure sensitive switch is caused to be depressed; and
the second housing has an opening in the semi-rigid deflective wall thereof adjacent to the indicator of the signalling circuit, said opening being covered by a light-transmitting material for premitting passage therethrough of light from the indicator.

13. A manually-actuated signalling device in accordance with claim 12 wherein:
the first and second housings are generally rectangular in configuration.

* * * * *